(12) United States Patent
Binford

(10) Patent No.: US 11,767,937 B2
(45) Date of Patent: Sep. 26, 2023

(54) DYNAMIC BELLOWS FLUID FITTING

(71) Applicant: B. & E. MANUFACTURING CO., INC., Torrance, CA (US)

(72) Inventor: John L Binford, Rancho Cucamonga, CA (US)

(73) Assignee: B. & E. MANUFACTURING CO., INC., Torrance, CA (US)

( * ) Notice: Subject to any disclaimer, the term of this patent is extended or adjusted under 35 U.S.C. 154(b) by 26 days.

(21) Appl. No.: 17/553,484

(22) Filed: Dec. 16, 2021

(65) Prior Publication Data

US 2023/0194027 A1    Jun. 22, 2023

(51) Int. Cl.

| | |
|---|---|
| *F16L 19/02* | (2006.01) |
| *F16L 19/06* | (2006.01) |
| *F16L 19/065* | (2006.01) |
| *F16L 19/10* | (2006.01) |
| *F16L 19/00* | (2006.01) |

(52) U.S. Cl.
CPC ......... *F16L 19/0212* (2013.01); *F16L 19/061* (2013.01); *F16L 19/065* (2013.01); *F16L 19/10* (2013.01); *F16L 19/005* (2013.01)

(58) Field of Classification Search
CPC ... F16L 19/0212; F16L 19/0218; F16L 17/08; F16J 15/52
See application file for complete search history.

(56) References Cited

U.S. PATENT DOCUMENTS

| | | | |
|---|---|---|---|
| 1,586,725 A * | 6/1926 | Westinghouse | F16L 27/0812 |
| 2,407,745 A * | 9/1946 | Jacobson | F16L 27/082 |
| 2,470,546 A | 5/1949 | Carlson | |
| 3,770,303 A | 11/1973 | Hallett | |
| 4,524,996 A * | 6/1985 | Hunt | F16L 58/182 |
| 4,679,828 A | 6/1987 | Bernardot | |
| 5,697,651 A * | 12/1997 | Fernandes | F16L 27/073 |
| 6,279,242 B1 | 8/2001 | Williams et al. | |
| 6,575,501 B1 | 6/2003 | Loy, Jr. | |
| 6,640,457 B2 | 11/2003 | Williams et al. | |
| 7,194,817 B2 | 3/2007 | Williams et al. | |
| 8,317,233 B2 | 11/2012 | Pionke et al. | |
| 11,009,158 B2 | 5/2021 | Brown et al. | |
| 2004/0036292 A1 | 2/2004 | Austin | |
| 2005/0212283 A1 * | 9/2005 | Frost | F16L 19/0212 |

(Continued)

FOREIGN PATENT DOCUMENTS

| | | |
|---|---|---|
| DE | 1475576 | 1/1969 |
| DE | 2715618 | 10/1977 |

(Continued)

OTHER PUBLICATIONS

Dall'Amico, Mauro, European Search Report, dated Apr. 5, 2023, 10 pages, European Patent Office, Munich, Germany.

*Primary Examiner* — Zachary T Dragicevich
(74) *Attorney, Agent, or Firm* — Henricks Slavin LLP

(57) ABSTRACT

A fitting for a fluid line that will contain pressurized fluid can include first and second fitting elements with respective sealing surfaces and an indicator element for indicating when a fluid seal has been formed. A fitting for a fluid line that will contain pressurized fluid can include first and second fitting elements with a sealing structure secured in one of the first and second fitting elements, wherein the sealing structure is axially resiliently compressible, one example of which includes a bellows element.

15 Claims, 6 Drawing Sheets

(56) References Cited

U.S. PATENT DOCUMENTS

2011/0303593 A1   12/2011  Reinhardt
2013/0099490 A1    4/2013  Kwon et al.
2017/0219144 A1*  8/2017  Petrou .................. F16L 27/087
2020/0271252 A1*  8/2020  Berghaus ............ F16L 19/0283

FOREIGN PATENT DOCUMENTS

WO    WO 2008/057983    5/2008
WO    WO 2015/187958   12/2015

\* cited by examiner

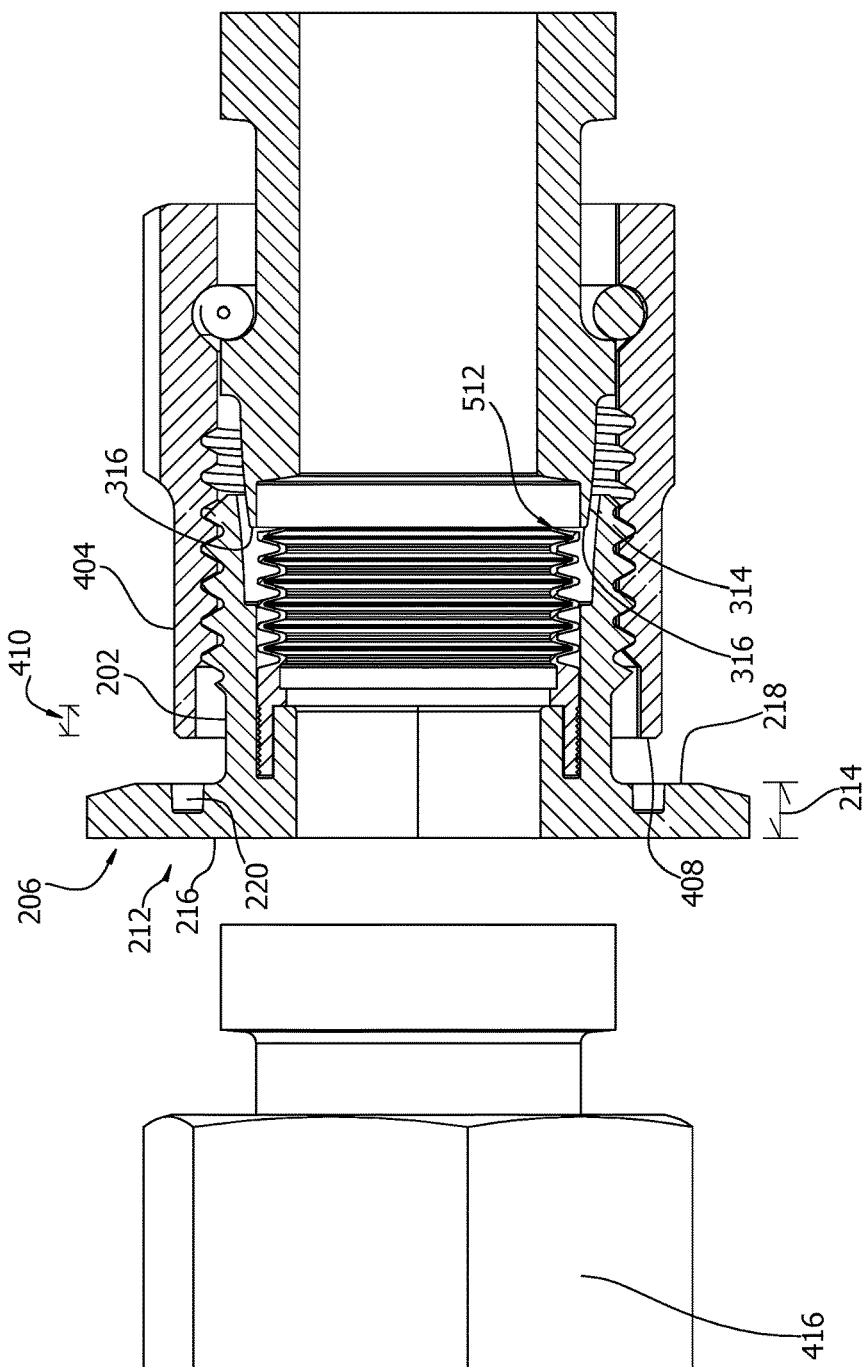

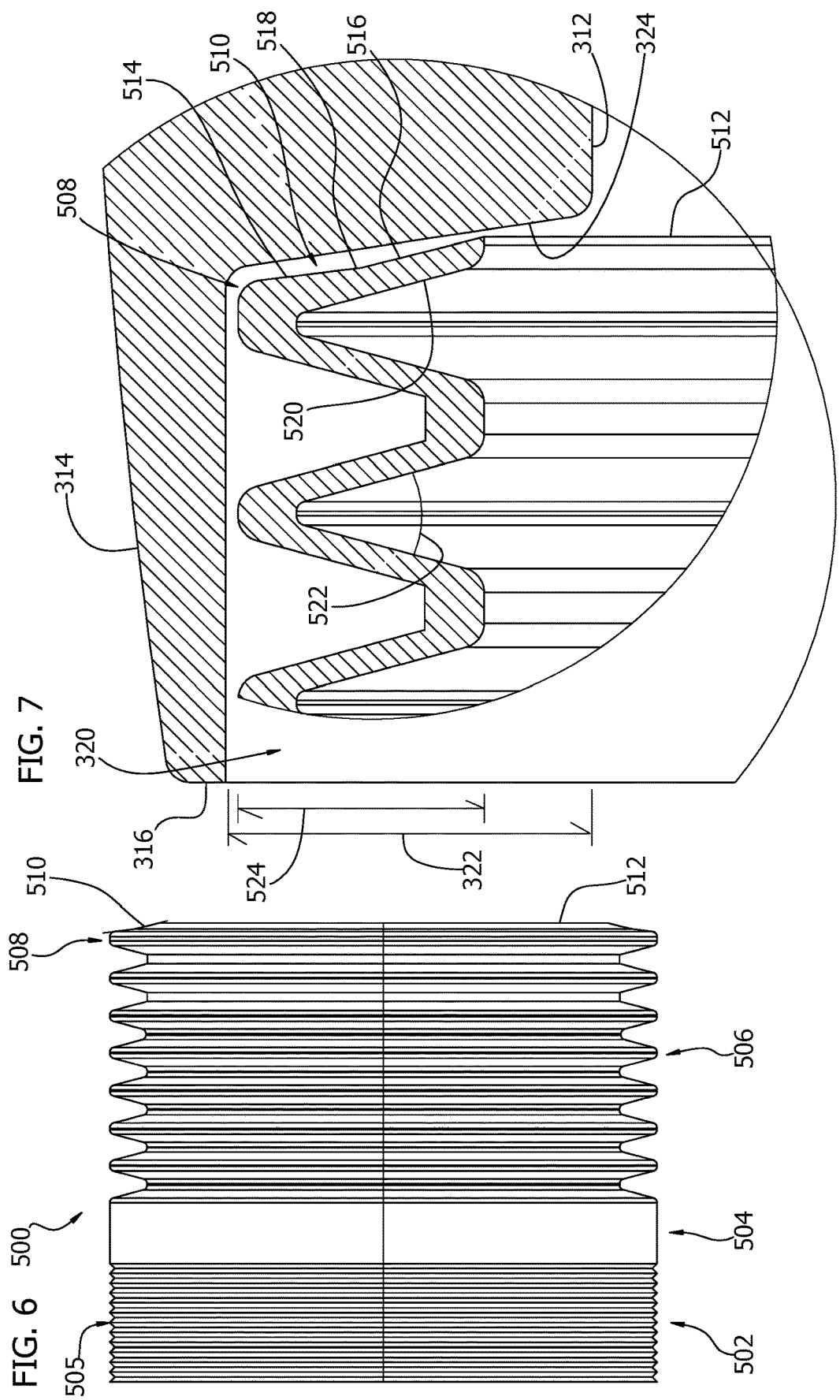

DYNAMIC BELLOWS FLUID FITTING

BACKGROUND

Field

These inventions relate to separable fluid fitting connections, including for example such fitting connections for hydraulic fluid lines. Such fittings in some examples may be used in high pressure fluid lines, including for example for use in aeronautical systems.

Related Art

Some existing separable fluid fitting connections may include threaded connections for hydraulic fittings. Separable hydraulic fittings having threaded connections are assembled by threading the connection to a specified torque, for example to ensure that contacting sealing surfaces within the fitting are in contact to the desired extent, for example over the desired surface area of contact and with the desired force and counterforce being maintained. In some applications, for example in aeronautical applications, the threaded connection for the fitting is intended to be tightened to a specified torque, and the fitting is verified by an inspector, including for example by confirming the application of the specified torque. Using an inadequate torque for the fitting, and/or having an inadequate verification by an inspector will lead to one or more fittings being checked with a torque wrench by other personnel, such as those associated with contractors or operators following production, or not being checked at all. If there is a leaking connection, fixing the leaking connection may require costly rework.

U.S. Pat. No. 8,317,233 illustrates a tube coupling apparatus having a metal sealing layer between facing beam sealing surfaces of first and second components. Sealing may or may not occur as desired according to an existing specification, but there may be fretting fatigue between the sealing surfaces and there is no easy means indicating that the desired sealing configuration has been achieved. Additionally, achieving and maintaining the desired seal between mating components may require a precision adding to the cost of an assembly, and possible assembly steps that can be simplified. For example, in the referenced patent, a seal is created using a metal sealing layer and heat to liquefy the metal sealing layer. Such use of a metal sealing layer and heat to finalize a seal may add to the cost of production. In similar fitting connections not using a metal sealing layer, creating the desired seal requires tightening the fitting with a first wrench followed by application of a specified torque using a torque wrench.

U.S. Pat. No. 4,679,828 shows a flareless end fitting in which a desired seal is created upon reaching a specified torque, depending on the fluid pressure rating of the assembly. Tightening to a specified torque requires a torque wrench, which is not as efficient as using a standard wrench for tightening.

U.S. Pat. No. 6,640,457 shows various visually perceptible marking configurations for ferrule-type tube fittings showing when the fitting has been pulled up.

It would be desirable to have a separable fluid fitting connection in which the desired seal reduces or eliminates fretting fatigue and/or whereby achievement of the desired seal can be visually apparent, can be achieved with standard tools without undesirable steps, and at reduced cost.

SUMMARY

In one example of a separable fluid fitting connection, a fitting is configured for a fluid line that will contain pressurized fluid. The fitting includes a first fitting element configured to join a second fitting element through relative axial movement of the first and second fitting elements. The first fitting element includes a cylindrical body extending around an axis, and a wall defining a bore through the first fitting element for allowing fluid to flow through the bore. A metallic sealing element is fixed in the first fitting element, wherein the sealing element is cylindrical with a first end portion fixed in the first fitting element adjacent the wall defining the bore, a body portion adjacent the first end portion wherein the body portion has a plurality of undulations and is resiliently axially compressible, and includes a second end opposite the first end forming a sealing surface facing away from the first end portion for sealing against a facing sealing surface on a second fitting element. Such a fitting allows compression of the metallic sealing element during assembly to produce a desired seal, for example receiving a load and producing a counter or reactive force in the metallic sealing element. Such a fitting also allows, if desired, a desired axial travel of fitting components to achieve a desired seal configuration.

A separable fluid fitting connection such as that described in the preceding paragraph may include one or more of the following features, taken individually or in accordance with all technically possible combinations:
the metallic sealing element may be formed monolithic;
the metallic sealing element may define an interior channel larger than the bore, for example by having a minimum inside diameter wherein the bore through the first fitting element includes a bore inside diameter less than the minimum inside diameter of the metallic sealing element;
the second end of the metallic sealing element terminates at a circular rim having an inside diameter smaller than a maximum outside diameter of the metallic sealing element;
a sealing surface on a second end of the metallic sealing element is non-planar;
a bellows forms the body portion of the metallic sealing element, and a bellows sealing element can include at least five undulations;
the first end portion of the metallic sealing element includes a non-smooth surface, for example to engage an adjacent surface in the first fitting element;
a second fitting element movable axially relative to the first fitting element, wherein the second fitting element includes a cylindrical body defining a bore through which fluid can pass, and in an example configuration, the second fitting element includes a facing sealing surface facing the second end sealing surface;
a second fitting element can be joined to the first fitting element and includes a facing sealing surface configured as a frustoconical surface;
a second fitting element joined to the first fitting element having a facing sealing surface in the form of a frustoconical surface forming an angle of substantially 8° to a plane perpendicular to the axis; or
a securing nut on the fitting assembly, and in an example configuration an indicator may be included on at least one of the securing nut and the first fitting element.

In another example of a separable fluid fitting connection, a fitting is configured for being included in a flow line that will contain pressurized fluid. Such a fitting can include a first fitting element, for example where the first fitting element includes a first cylindrical body centered on a central axis, wherein an outer surface of the first cylindrical body includes a first engagement structure. An inner surface of the first cylindrical body may be configured to permit fluid flow through the first fitting element. Such a fitting can also include a second fitting element wherein the second fitting element includes a second cylindrical body centered on a central axis having a second inner surface configured to permit fluid flow through the second fitting element. In the fitting, one of the first and second cylindrical bodies includes an outer surface configured to contact an inner surface of the other of the first and second cylindrical bodies. A releasable tightening element is included in the assembly having a second engagement structure configured to engage the first engagement structure such that tightening the releasable tightening element moves the first and second fitting elements relative to each other toward engagement, and loosening the releasable tightening element moves the first and second fitting elements relative to each other for disengagement. A sealing surface is associated with the first fitting element for contacting a sealing surface on the second fitting element. An indicator element is included on at least one of the first fitting element and the releasable tightening element and is configured so that the indicator element is more visible when the first fitting element and the releasable tightening element are in a first position relative to each other, and the indicator element is less visible when the first fitting element and the releasable tightening element are in a second position relative to each other. Such a configuration can provide a visual indication of a complete seal according to a desired specification.

A separable fitting for a fluid line according to the preceding paragraphs may also include one or more of the following features, taken individually or in accordance with all technically possible combinations:

- an indicator element may form a portion of a rim surface on a releasable tightening element, and in an exemplary configuration, an indicator element may be movable into and out of a groove in a first fitting element;
- an indicator element may be configured such that the indicator element is less visible when a releasable tightening element is tightened on to a first fitting element;
- an indicator element may be configured such that the visibility of the indicator element is inversely proportional to a tightening of a releasable tightening element on a first fitting element;
- an indicator element may be configured such that the indicator element is no longer visible when first and second fitting elements on a separable fluid fitting connection are engaged a desired amount;
- an indicator element may be configured such that the indicator element is no longer visible when a sealing surface associated with a first fitting element contacts a sealing surface on a second fitting element a desired amount;
- a first fitting element includes an outwardly extending flange element containing a groove and wherein an indicator element is movable with the releasable tightening element into and out of the groove;
- a sealing surface associated with a first fitting element in a separable fluid fitting connection includes a sealing surface on a compressible undulating structure;
- a sealing surface associated with a first fitting element includes a beam seal on an annular bellows structure;
- a sealing surface associated with a first fitting element includes a bellows structure having an annular ring secured into a groove in a first fitting element.

These and other examples are set forth more fully below in conjunction with drawings, a brief description of which follows.

BRIEF DESCRIPTION OF THE DRAWINGS

FIG. 3 is a side elevation view of the fitting of FIG. 2.

FIG. 4 is a longitudinal cross-section of the fitting of FIG. 2.

FIG. 6 is a side elevation view of an example of a fitting element for forming a seal in the fitting of FIG. 2, in the present example having the form of a bellows.

FIG. 7 is a detail of a longitudinal cross-section of the example of the bellows fitting element of FIG. 6 and of a longitudinal cross-section of another fitting element in the fitting of FIG. 2 showing surfaces used for forming a seal in the fitting.

DETAILED DESCRIPTION

Figure 1:
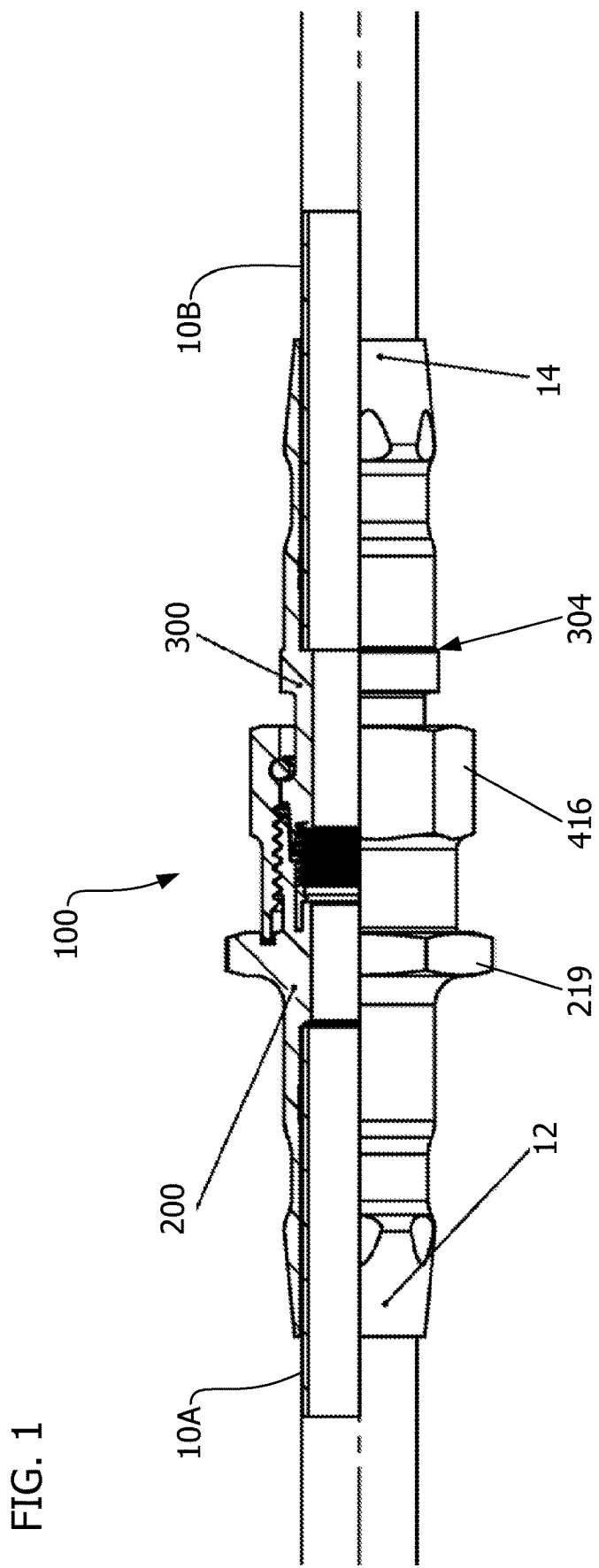
FIG. 1 is a side elevation view of a fluid line with a separable fitting.

This specification taken in conjunction with the drawings sets forth examples of apparatus and methods incorporating one or more aspects of the present inventions in such a manner that any person skilled in the art can make and use the inventions. The examples provide the best modes contemplated for carrying out the inventions, although it should be understood that various modifications can be accomplished within the parameters of the present inventions.

Examples of fittings and of methods of making and using the fittings are described. Depending on what feature or features are incorporated in a given structure or a given method, benefits can be achieved in the structure or the method. For example, fittings using an indicator can reliably form a fluid seal in a junction for a fluid line with a visual or other indication of successfully forming a fluid seal. A visual or other indication can be used in place of existing inspection techniques. Additionally, fittings using an axially compressible component can form a reliable seal and a preload in the fitting assembly.

These and other benefits will become more apparent with consideration of the description of the examples herein. However, it should be understood that not all of the benefits or features discussed with respect to a particular example must be incorporated into a fitting, component or method in order to achieve one or more benefits contemplated by these examples. Additionally, it should be understood that features of the examples can be incorporated into a fitting, component or method to achieve some measure of a given benefit even though the benefit may not be optimal compared to other possible configurations. For example, one or more benefits may not be optimized for a given configuration in order to achieve cost reductions, efficiencies or for other reasons known to the person settling on a particular product configuration or method.

Examples of a number of fitting configurations and of methods of making and using the fittings are described herein, and some have particular benefits in being used together. However, even though these apparatus and methods are considered together at this point, there is no requirement that they be combined, used together, or that one component or method be used with any other component or method, or combination. Additionally, it will be understood that a given component or method could be combined with other structures or methods not expressly discussed herein while still achieving desirable results.

Fittings for high pressure hydraulic fluid lines for aircraft are used as examples incorporating features and benefits as described herein. Such fittings operate in extreme environments and must meet a number of standards. Common forms of connections used in aerospace for coupling a fluid line include fittings having a beam seal end, flareless end, or a flared end, and the fitting configurations described herein can be used in place of such conventional fittings. However, features of the fittings described herein can also be applied to fluid lines for other applications, including lower pressures, and/or other equipment than aircraft.

As used herein, "substantially" and "approximately" shall mean the designated parameter or configuration, plus or minus 10%. However, it should be understood that terminology used for orientation or relative position, such as front, rear, side, left and right, upper and lower, and the like, may be used in the Detailed Description for ease of understanding and reference, and may not be used as exclusive terms for the structures being described and illustrated.

In one example of a fitting for coupling a fluid line to another fluid line or to a structure or for coupling elements commonly releasably joined for allowing fluid flow through the fitting, a fitting assembly 100 and 100a (FIGS. 1-8) is formed from a plurality of components into an assembly for connecting two components for allowing fluid flow between the components. The fitting assembly would be used in place of any number of conventional fittings, but the present description will be made in the context of a fitting assembly for connecting two fluid lines 10A and 10B (FIG. 1). The fluid lines 10A and 10B are secured to respective ends of fitting elements by elements such as sleeves 12 and 14 of the fitting assembly 100 or other appropriate structures using conventional processes, such as by swaging or crimping or other conventional means for sealingly securing a fluid line to a respective fitting element. The end portions of each of the fluid lines are coupled to the respective fitting element spaced apart from an area in the fitting assembly at which a primary fitting fluid seal is formed between separable mating fitting elements, and as illustrated, each of the fluid lines is coupled proximally of control surfaces such as wrenching elements on the respective fitting element. However, installation of elements of the fitting assembly 100 on to fluid lines or other related structures are not discussed in any further detail.

In the present example, the fitting assembly 100 (FIGS. 1-7) for the fluid line 10 forms a separable connection between the lines 10A and 10B, such as would be formed for a high pressure hydraulic fluid line, for example in an aerospace application. The fitting assembly includes a first fitting element 200 to be joined with the fluid line 10A in accordance with conventional methods, and a second fitting element 300 to be joined with the fluid line 10B in accordance with conventional methods. In an example of a fluid line being coupled to a fixed structure, the first fitting element 200 can be considered as forming part of the fixed structure, while the second fitting element 300 can be considered the fitting carried on the fluid line to be separably coupled to the fixed structure.

As illustrated in FIGS. 2-5, the fitting assembly also includes a securement element for securing the first and second fitting elements together to form the fitting assembly 100. In the present example, the securement element is a releasable tightening element or securing nut 400, configured to tighten the first and second fitting elements together. In one example, the releasable tightening element 400 is captured on the second fitting element 300 in such a way that the releasable tightening element can move axially and rotationally relative to the second fitting element to reliably engage the first fitting element, for example so that the first and second fitting elements can form a fluid seal between them.

The fitting further includes an indicator element for indicating when the first and second fitting elements are joined to the desired extent. The indicator element may be placed on either the first fitting element or on the second fitting element or may be configured to be on both the first and second fitting elements in such a way that the desired joining of the first and second fitting elements is indicated as desired. In the present examples, the desired joining of the first and second fitting elements is indicated visually, for example by an indication of a color or lack of color, visibility or lack of visibility of a structure, or visibility of a scale or value (such as a number or line or scale magnitude, structure size, etc.) representing the extent to which the first and second fitting elements are joined.

In the illustrated example, the fitting assembly 100 includes an indicator element 402 on the releasable tightening element 400 (FIGS. 2-5). The indicator element is formed on an outside surface of a cylindrical body 404 of the releasable tightening element, and in the illustrated example, the indicator element extends circumferentially around the entire perimeter of the body, at a distal end portion 406 opposite the fluid line 10B. The indicator element 402 extends axially from a distal end surface 408 (FIG. 4) proximally an axial distance 410 selected according to the desired form of indicator indicating that the first and second fitting elements are joined as desired. In the present example, the axial distance 410 is selected so that the indicator element 402 is no longer visible, as discussed more fully below, when the first and second fitting elements are joined to the desired extent.

The first and second fitting elements are configured to be joined together to form a fluid junction, and the releasable tightening element is configured to secure the first and second fitting elements together forming a desired seal, which is achieved when the first and second fitting elements are joined to the desired extent. In the illustrated example, the first fitting element includes a first cylindrical body 202 (FIGS. 4-5) centered on a central axis 204, so that the body is formed as a revolution about the central axis. As illustrated, the first fitting element extends distally from the coupling element 12 (FIG. 1) to a proximal portion 206, which is spaced distally from the fluid line 10A, and then distally to an end portion 208 (FIG. 5), which end portion will be adjacent a distal end portion of the second fitting element when the fitting is assembled, as discussed further below.

Figure 5:
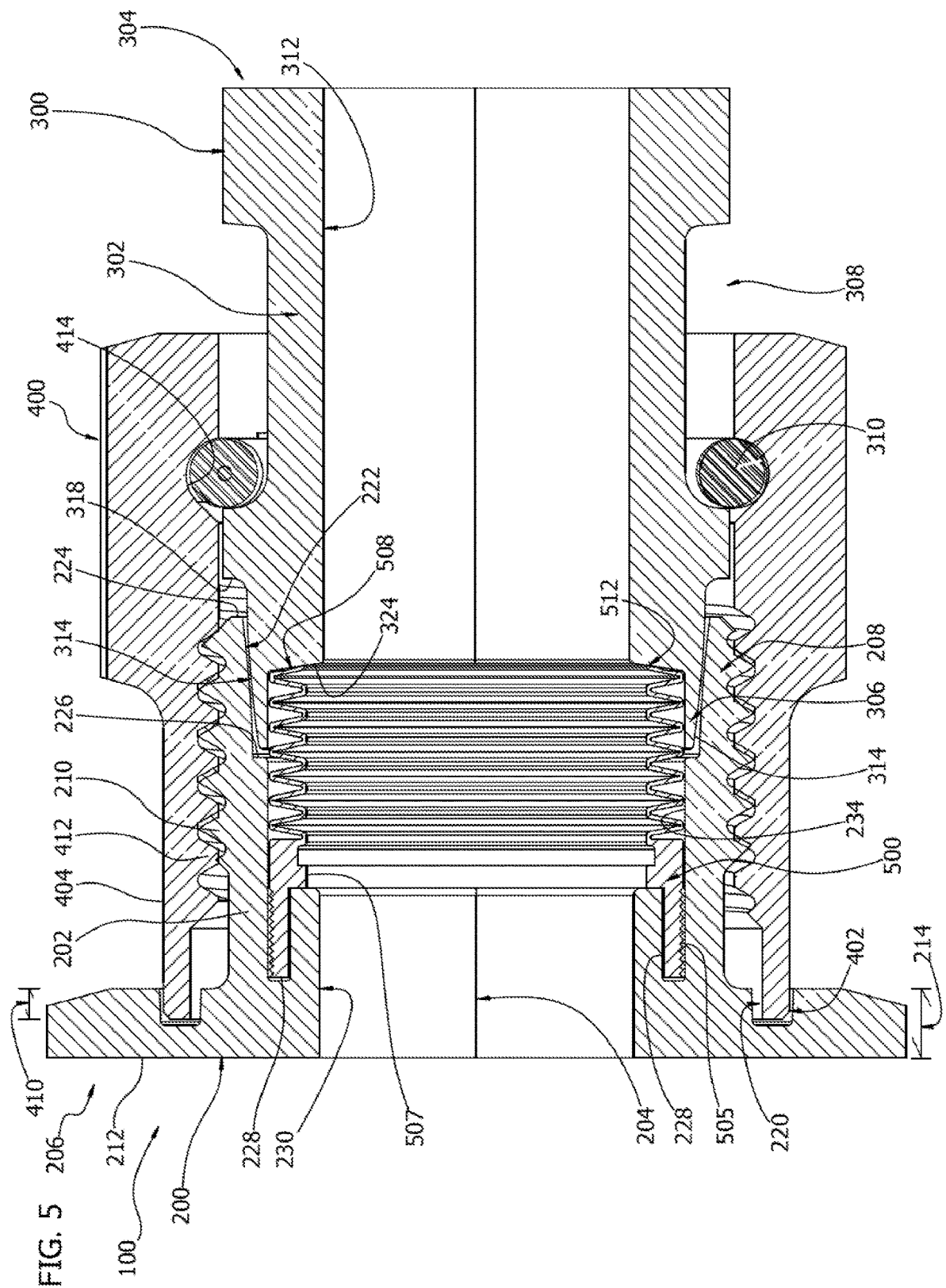
FIG. 5 is a longitudinal cross-section of the fitting of FIG. 2 wherein the fitting elements are in a second spatial configuration forming a seal and indicating successful formation of a seal.
Figure 8:
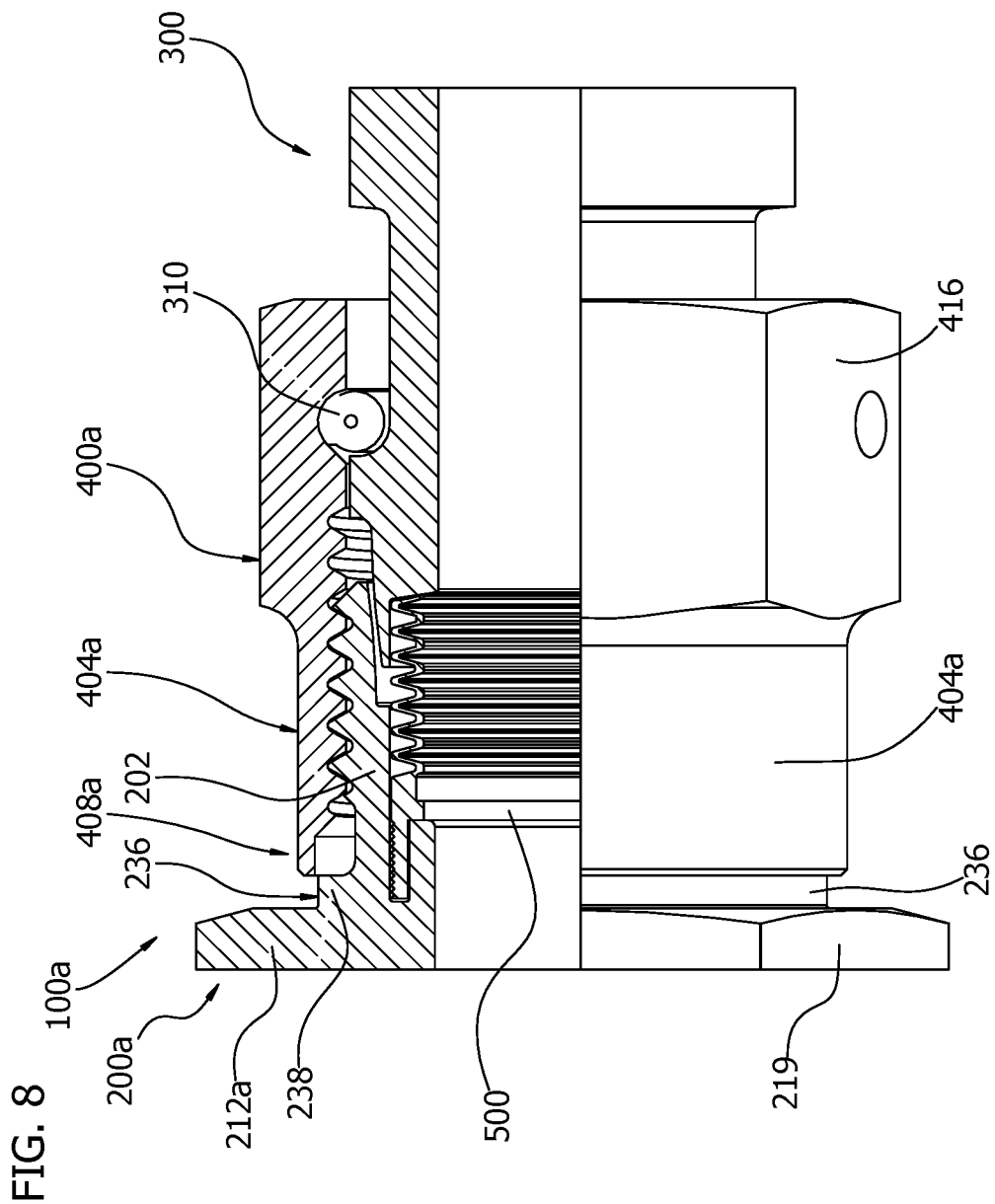
FIG. 8 is a partial longitudinal section view of an alternative fitting similar to that shown in FIGS. 1-7, in a first spatial configuration similar to that of FIGS. 3-4, with an alternative indicator configuration.

The body of the first fitting element includes a first engagement structure on an external surface of the body extending proximally from the end portion 208, and in the present example, the first engagement structure is configured as external threads 210 (FIG. 5). The external threads are engaged by complementary threads on the releasable tightening element 400 described further below. The external threads extend proximally the desired amount for reliable securement of the releasable tightening element on the first fitting element.

Figure 2:
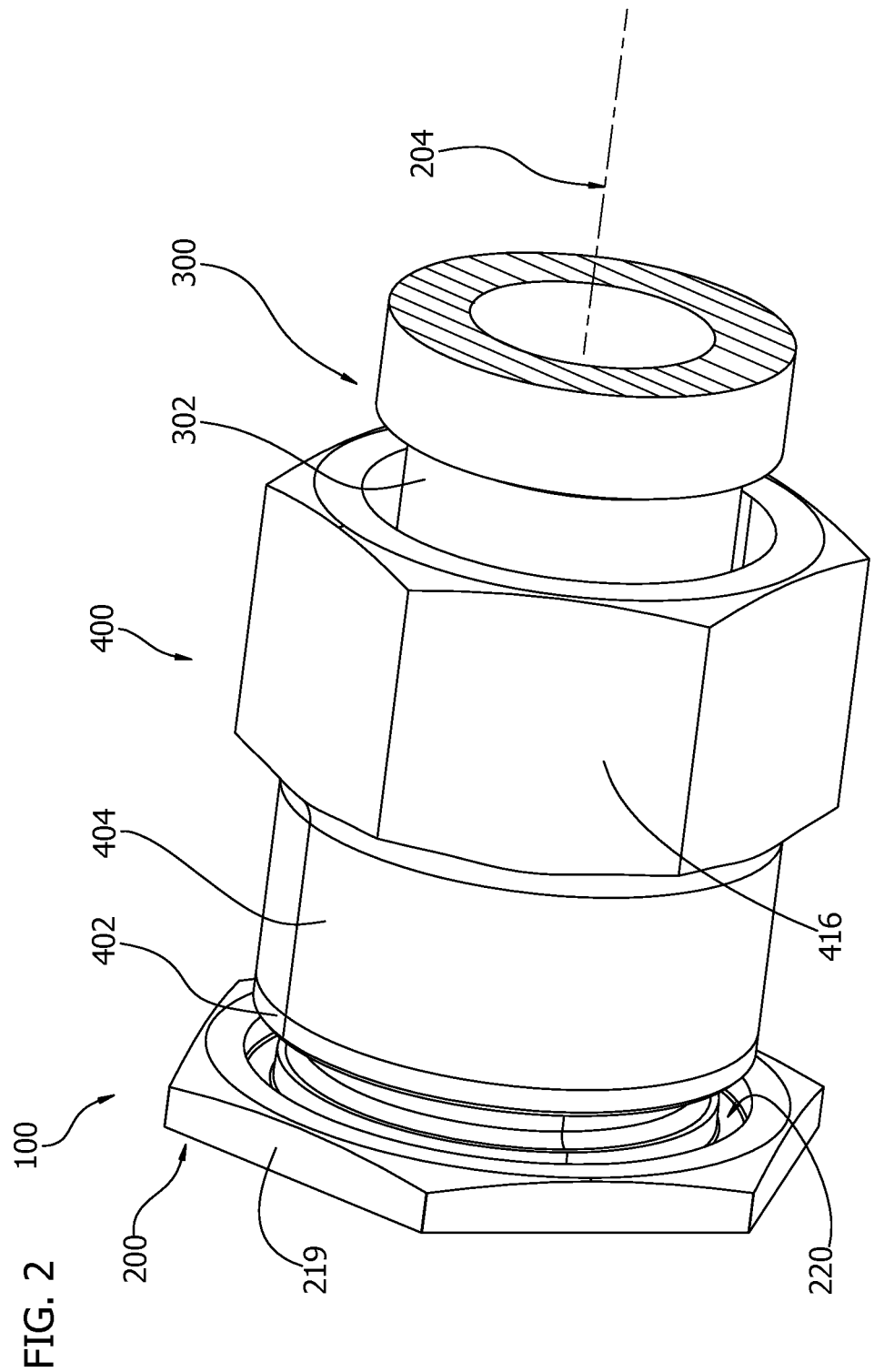
FIG. 2 is an isometric view of a fitting such as that in FIG. 1, truncated and without tube coupling sleeves, for a fluid line and in the form of an assembly of fitting elements, wherein the fitting elements are in a first spatial configuration.

The first fitting element includes an outwardly extending flange element in the form of a base 212 having a flange thickness 214 (FIG. 4) extending from a proximal base surface 216 to a distal base surface 218. The base extends completely around the axis 204, and the perimeter surface of the base includes wrenching flats 219 (FIGS. 2-3).

The first fitting element includes indicating means for helping with the second fitting element to indicate when the first and second fitting elements are joined to the desired extent and/or when the desired fluid seal is formed. In the illustrated example, the indicating means on the first fitting element is in the form of an annular groove 220 (FIGS. 4-5) for receiving and hiding or covering the indicator element 402 on the releasable tightening element. In the present configuration, the depth of the annular groove is greater than or equal to the axial length 410 of the indicator element, for example so that the entire visible portion of the indicator element is recessed at or below the distal base surface 218 when the first and second fitting elements are joined to the desired extent. In such a configuration, joining of the first and second fitting elements to the desired extent is indicated by the disappearance of the indicator element, or the lack of visibility of the indicator element from a position radially outward from the distal base surface 218. In one configuration, the depth of the annular groove 220 and the dimensions of the first and second fitting elements are selected so that the distal end 408 on the second fitting element contacts the bottom surface of the annular groove 220 at or after the first and second fitting elements are joined to the desired extent and/or the desired fluid seal is formed, in one example the desired fluid seal described below, for example with a bellows sealing element.

In another example (FIG. 8), in which common elements are numbered identically, the indicating means on the first fitting element 200*a* is a color, color band 236 or other element visible when the first and second fitting elements 200*a* and 400*a*, respectively, are not fully joined or the seal not fully formed, and less visible or entirely invisible when the first and second fitting elements are joined to the desired extent and/or the seal fully formed. In the illustrated example, the color band 236 is formed on an annular shoulder 238 extending distally of the base and radially outward of the body 202. The color band alternatively can be replaced by other visible or indicating means. The body 404*a* of the releasable tightening element 400*a* is substantially the same as the body 404 but without the color band or other indicating means, so that the body 404 and the distal end portion 406 of the body are continuous from the wrenching flats to the distal end surface 408*a*. The distal end portion of the body wall will cover the indicator band 236 when the first and second fitting elements have joined the desired amount and/or the desired seal has been formed.

In a further example (not shown), the releasable tightening element and/or the first fitting element would include notches or other variations in the end of the releasable tightening element or the shoulder, such that the notches or other variations are visible before and invisible when the first and second fitting elements are joined to the desired extent and/or the desired fluid seal is formed.

The end portion 208 of the first fitting element includes a frustoconical interior surface 222 extending proximally from the distal end surface 224 of the first fitting element. The surface 222 angles inward and axially to a radially extending circular shoulder 226. The shoulder forms an annular surface in the body 202. The frustoconical interior surface 222 in longitudinal cross-section may form a convex curve so that a straight line intersects the convex curve at a point. The frustoconical interior surface 222 receives and contacts a similar though not identically complementary surface on a distal end portion of the second fitting element.

The second fitting element 300 includes a cylindrical body 302 centered on the central axis 204. The cylindrical body 302 is formed as a revolution about the central axis. As illustrated, the second fitting element extends distally from the coupling element 14 to a proximal portion 304, which is spaced distally from the fluid line 10B, and then to a distal end portion 306 (FIG. 5), which distal end portion will be adjacent the end portion 208 of the first fitting element when the fitting is assembled.

The body 302 of the second fitting element may include an outer circumferential groove 308 extending over less than the full axial length of the second fitting element. The groove 308 may accommodate a retaining wire 310 (FIG. 5) or other structure, for example a shoulder on the tightening element, for helping to retain the releasable tightening element 400 together with the second fitting element forming a second fitting assembly. The retaining wire 310 and the groove 308 allow limited axial movement of the second fitting element and the retaining element 400 relative to each other, and also allows relative rotational movement between them. The lengths of the groove 308 and the size of the retaining wire are selected so as to join the first and second fitting elements the desired amount when the releasable tightening element 400 has been secured on to the first fitting element the desired amount. Alternatively, other means may be used to secure the tightening element relative to the second fitting element while allowing rotational and translational movement.

The second fitting element includes a wall defining a bore 312 extending through the interior of the second fitting element and concentric with the central axis 204. The bore 312 will contain fluid that enters the second fitting element either from the fluid line 10B in the area of the proximal portion 304 or from the direction of the first fitting element, and fluid will contact and flow through the bore 312.

The distal end portion of the second fitting element includes a frustoconical exterior surface 314 extending proximally and outwardly from a distal end 316 of the second fitting element (FIGS. 4 and 7). The exterior surface 314 angles outward and axially to a radially extending shoulder 318 (FIG. 5), terminating at the outer surface of the body of the second fitting element. The frustoconical outer surface 314 in longitudinal cross-section may form a convex curve so that a straight line intersects the convex curve at a point. As the first and second fitting elements are joined, the frustoconical interior surface 222 in the first fitting element and the frustoconical exterior surface 314 in the second fitting element will approach each other and in some cases they may contact each other depending on the tolerances incorporated into the design. Convex surfaces 222 and 314 help to stabilize the joint, such as under bending loads. If they contact each other, for example under a large enough bending load or after the first and second fittings are joined in such a way that they contact, one or both surfaces being convex helps to provide a single point-to-point contact under a bending load without translation. When they contact under a bending load, they help to absorb the bending load while allowing the sealing surfaces described more fully below to maintain a sealing contact. A limited contact such as a point-to-point contact reduces the possibility of fretting fatigue that might arise under bending loads because relative translation between the surfaces 222 and 314 is reduced or eliminated. Contact between surfaces 222 and 314 under bending load helps to maintain a desired contact between surfaces 514 and 516 for a fluid seal, described more fully below. The extent of the contact between the two frustoconical surfaces and the ability of the fluid seal to withstand fluid pressure will depend on the design configuration of the first two conical surfaces and the extent of the engagement between the first and second fitting elements as they are joined. In one configuration, the exterior and interior surfaces 314 and 222, respectively, may be configured to provide a form of fluid seal for the fitting, while in an alternative or additional configuration, described more fully below, the primary fluid seal can be provided by another structure, for example a bellows structure.

The first and second fitting elements are joined by bringing their distal portions closer together and having the distal portion of the second fitting element extend within the distal portion of the first fitting element. With sufficient axial movement together, the inner and outer frustoconical surfaces will contact. Conversely, they can remain out of contact with each other as the fitting is secured, depending on the design dimensions. Joinder of the first and second fitting elements can occur through relative axial movement between the second fitting element 300 and the releasable tightening element 400 on the one hand and the first fitting element 200 on the other hand. In the illustrated configuration, the releasable tightening element 400 includes a bore having internal threads 412 (FIG. 5) extending in an interior portion between the end surface 408 and a retaining wire groove 414. In the present example, the threads extend less than the axial length between the end surface 408 and the retaining groove. The internal threads are complementary to the external threads 210 on the first fitting element, and allow the releasable tightening element to advance on the external threads 210. The mating threads are configured for withstanding the loads created in forming a seal in the fitting, limiting the possibility of unthreading during expected operation, and withstanding the fluid pressure expected in the fluid line. The pitch of the threads is selected to provide the desired relative axial movement between the first and second fitting elements to provide a desired seal, and in the present configuration to provide the desired indication through the indicator element. In one configuration, the pitch of the threads and the dimensions of the first and second fitting elements are selected so that the desired seal is formed at the same time as or shortly before the indicator elements provide the desired indication. The releasable tightening element 400 includes tightening surfaces, for example hex wrenching surfaces 416 (FIGS. 2-3).

In one example, the indicator element 402 is a paint or texture on the external surface of the releasable tightening element. The indicator element is more visible when the first fitting element and the releasable tightening element are in a first position relative to each other, such as those positions illustrated in FIGS. 2-4, such as where the first and second fitting elements are not more fully joined together. The indicator element is less visible, and in the illustrated example is not visible when the first fitting element and the releasable tightening element are in a second position relative to each other, as illustrated in FIG. 5. For example, the indicator element is invisible when the first and second fitting elements are engaged to the fullest extent (though not necessarily with the convex surfaces 222 and 314 contacting, depending on the design configuration) and the releasable tightening element is fully tightened, and when the desired fluid seal has been formed. With threading and unthreading of the releasable tightening element relative to the first fitting element, the indicator element is movable into and out of the groove 220 in the first fitting element, or in the context of the example illustrate in FIG. 8, the indicator element is covered and uncovered by the releasable tightening element.

On assembly, fluid conduits are securely attached to the respective first and second fitting elements, for example using conventional means as illustrated in FIG. 1. The first and second fitting elements are then brought together so that the respective distal portions are joined, and the releasable tightening element threaded onto the external threads of the first fitting element. As the releasable tightening element advances on the first fitting element, the retaining wire 310 or other structure bears against the second fitting element, further joining the first and second fitting elements and possibly bringing the inner and outer frustoconical surfaces into contact with each other as threading continues. At the desired time when the desired seal is formed, for example with any of the seal configurations described herein, the indicator element indicates that the desired seal has been formed. In the example described above, the inner and outer frustoconical surfaces have approached into close proximity with each other, and the indicator portion 402 has fully extended into the groove 220 in the first fitting element, or the indicator element 236 is completely covered by the distal portion 408a of the releasable tightening element 400a of FIG. 8.

In another example of a fitting assembly (FIGS. 1-7), the fitting assembly includes an axially resilient seal element, in the present example resilient sealing element 500. The sealing element is secured to the first fitting element and forms a seal against a surface in the second fitting element. In the illustrated example, the sealing element 500 is a hollow structure formed as a revolution about a central axis, coaxial with the central axis 204 when assembled with the first fitting element. The sealing element includes a securement portion 502, a body portion 504 and a sealing or sealing body portion 506. As illustrated, the sealing element 500 is monolithic. The securement portion 502 extends into and is fixed in an interior groove 228 formed in the body 202 of the first fitting element between a bore 230 extending through the first fitting element and the outside wall of the body. In the illustrated configuration, the bore 230 in the first fitting element is coaxial with and has the same inside diameter as the bore 312 in the second fitting element. The bore 230 in the first fitting element receives fluid either from the nearby conduit 10A or from the second fitting element, allowing the fluid to contact and flow through the bore 230.

The securement portion 502 of the sealing element is formed by a cylindrical wall, configured to be closely fitting with the interior groove 228. The sealing element is secured in the first fitting element by radially swaging the outside surface of the first fitting element body 202 to securely capture the securement portion 502 in the groove. In one configuration, a cylindrical surface of the securement portion is textured or non-smooth to enhance the securement from the swaging. The cylindrical surface may be corrugated, knurled, or otherwise varied to improve the securement in the first fitting element. In the example illustrated, the textured surface 505 is on the external cylindrical surface of the securement portion.

The securement portion extends axially from the body portion 504, which has approximately the same outer diameter as the securement portion, and has a radially-inward extending shoulder 507 for contacting an adjacent radially-extending wall on the first fitting element, extending between the bore 230 and the groove 228.

The sealing portion 506 extends from the body portion 504 in a direction opposite the securement portion 502. In the present configuration, the sealing portion 506 is resiliently axially flexible between at least a portion of the structure between the body portion and a sealing end portion 508. In the illustration, the sealing portion is a bellows structure or other structure having undulations or other cyclically repeating structural configuration, allowing axial compression, for example when the first and second fitting elements are brought closer together, and allowing resilient recovery when the first and second fitting elements move apart. The resiliently axially flexible sealing element provides a counterforce against the tightening of the first and second fitting elements, helps to ensure contact between the sealing element and the opposite sealing surface 324, and helps to reduce or eliminate fretting fatigue in the sealing surfaces. It also provides axial movement of a magnitude that allows the use of an indicator element that can produce a visible or perceptible change between a first configuration, for example where the first and second fitting elements are somewhat separated axially and a second configuration where the first and second fitting elements are less separated or closer together. The axial movement can allow the indicator element to function as desired, for example as described herein.

The sealing portion 506 includes an end surface element 510 configured to form a fluid seal with an adjacent surface on the second fitting element. In the present configuration, the end surface element 510 extends inward toward the central axis 204 and terminates at a rim 512. As illustrated, the rim 512 is approximately on the inside diameter of the sealing element, where the end surface element 510 extends from an outside diameter to the rim at the inside diameter. While the sealing portion can take a number of configurations, the illustrated example has the sealing portion with repeating undulations, where adjacent walls of the undulations form approximately 30° included angles. The sealing portion includes at least five undulations, and in the illustrated example, seven undulations terminating at the end surface element 510. Each of the undulations is substantially identical to the others. The undulations can have a sawtooth or triangular shape, sinusoidal shape or other repeating configuration. The wall thickness of each undulation can be substantially identical, or can vary either within an undulation or between undulations.

The end surface element 510 can also take a number of configurations. In one example, the end surface element has an end profile complementary to the adjacent mating surface on the second fitting element. In one example, the end surface element extends inward substantially along a radius or a plane perpendicular to the central axis, while in another example the end surface element extends inward at an angle to the central axis 204. The end surface element can also be substantially flat from the outside diameter to the rim 512, or can have other surface configurations. In one example, the surface configuration of the end surface element can be defined by two substantially flat circular surfaces, namely an outer circular surface 514 and an inner circular surface 516 joining to form an angle in transverse cross-section at a midpoint 518, forming an angle relative to each other of approximately 174°. The inside surface 520 extends at approximately the same angle as the other elements of the bellows, which define included angles 522 of approximately 30°. The outer and inner circular surfaces contact an adjacent surface on the second fitting element to form spaced apart sealing surfaces such as a first sealing surface and a second sealing surface.

In the present example, the second fitting element 300 includes a counterbore 320 (FIG. 7) defining a larger diameter recess for receiving a portion of the sealing portion 506. The diameter of the counterbore is larger than the inside diameter of the bore 312, and the difference between the inside diameter of the bore 312 and the inside diameter of the counterbore 320 is the distance represented at 322. The counterbore 320 and the outer frustoconical surface 314 provide a taper to the distal portion of the second fitting element.

The counterbore 320 terminates at a sealing surface 324 extending inward toward the central axis from the side wall of the counterbore. In the illustrated example, the sealing surface 324 is substantially flat, and as illustrated the sealing surface 324 in cross section extends at an angle to the central axis, of about 98°. In this configuration, the sealing surface 324 forms a frustoconical surface approximately complementary to the end surface element 510, for example so that the sealing surface 324 and the end surface element 510 extend approximately parallel to each other, subject to the surface variations formed by surfaces 514 and 516. In one example, sealing surface 324 forms a first angle with the central axis and the surface 514 forms another angle with the central axis 1-2 degrees greater.

When the first and second fitting elements join together and end surface element 510 contacts the sealing surface 324 on the second fitting element, the end surface element and the sealing surface 324 form a fluid seal. In the present example, the fluid seal between the end surface element and the sealing surface forms the primary separable fluid seal for the fitting. The resiliently compressible sealing portion of the sealing element 500 provides a preload reaction force against the second fitting element as the first and second fitting elements join and the releasable tightening element brings the first and second fitting elements axially closer together. When the releasable tightening element includes an indicator element and is advanced sufficiently to have the indicator element indicate that the first and second fitting elements are positioned as desired for the desired seal, the end surface 510 bears against the sealing surface 324 sufficiently to form the desired releasable fluid seal. The sealing element indicates that the first and second fitting elements have been positioned as desired and/or the desired seal is formed. In the illustrated configuration, the indicator element is adjacent the primary seal and spaced apart from and intermediate the ends of the fluid lines, so that the indicator element indicates whether or not the separable seal is formed, and can do so repeatably over the lifetime of the sealing element.

The sealing portion 506 of the sealing element 500 has an inside diameter and an outside diameter, and the difference between the inside and outside diameters is represented at 524 (FIG. 7). As illustrated, the inside diameter of the sealing portion 506 is greater than the inside diameter of the bore 312. Additionally, the sealing portion 506 is configured to be positioned closer to the outside wall of the counterbore 320 than to the bore 312. Also as illustrated, the diameter of the counterbore 320 is approximately the same as the diameter of the bore 234 in the first fitting element in which the sealing element 500 is positioned. In this configuration, the sealing portion 506 is well supported in the radial direction by the bore/counterbore of the first and second fitting elements.

The first and second fitting elements and the releasable tightening element can be formed from a number of materials, the materials for which may depend on the application. For high pressure fluid applications, some of which may be found in some aerospace applications, materials may include titanium or aluminum alloys, or 304 stainless steel or other suitable stainless steels, for example. The sealing element configured as a bellows structure can also be titanium, aluminum or stainless steel alloys. The sealing element may be a different metal alloy than the first and second fitting elements and the releasable tightening element. The material of the sealing element is selected so as to avoid plastic deformation during expected use for the selected geometric configuration.

On assembly of the fitting elements having a separate sealing element such as sealing element 500, the securement portion 502 of the sealing element is inserted into the groove 228 in the first fitting element. The outer wall of the body of the first fitting element 200 is radially swaged to fix the sealing element and the first fitting element relative to each other, both axially and rotationally. The releasable tightening element 400 is captured on the second fitting element by the retaining wire 310 or other structure. The first and second fitting elements are fixed onto respective fluid flow structures, for example hydraulic lines 10A and 10B, respectively, at the desired time, which may for example be at the aircraft or other manufacturing site. The fittings are then joined by aligning them axially, and threading the releasable tightening element 400 onto the mating threads 210 of the first fitting element 200. The releasable tightening element is then threaded down using the wrenching flats 416 while holding the first fitting element 200 stationary with the flats 218. Threading continues until the first and second fitting elements are secured together sufficiently and/or so as to form the desired fluid seal. If an indicator element is not included with the assembly, a securement and/or a proper seal may be confirmed using a torque wrench or other method of confirming the desired seal. If an indicator is included with the assembly, such as the indicator element 402/236, the releasable tightening element 400/400a is threaded onto the first fitting element until the indicator element indicates that the desired securement and/or fluid seal has been formed.

To separate the fitting, the releasable tightening element is unthreaded to enable the first and second fitting elements to be separated. This allows the sealing portion of the sealing element 500 to recover and extend axially, until the fitting is reconnected in the manner described above.

The fitting configuration having an indicator for indicating a proper separable fluid seal permits faster assembly using standard wrenches/tools, and there is no need to switch from a standard wrench to a torque wrench to verify forming the desired seal. Additionally, a fitting configuration having a bellows seal element provides an alternative seal configuration to conventional fitting assemblies, and provides a desirable fluid seal created through axial movement of a releasable tightening element and joining of first and second fitting elements. An assembly having both an indicator element and a discreet axially resilient seal element, in one example a bellows element, provides faster assembly and formation of a reliable fluid seal using standard tools.

Having thus described several exemplary implementations, it will be apparent that various alterations and modifications can be made without departing from the concepts discussed herein. Such alterations and modifications, though not expressly described above, are nonetheless intended and implied to be within the spirit and scope of the inventions. Accordingly, the foregoing description is intended to be illustrative only.

What is claimed is:

1. A fitting assembly comprising:
a first fitting element including a cylindrical body extending around an axis and a wall defining a first bore with a first bore diameter through the first fitting element for allowing fluid to flow through the first bore;
a sealing element fixed inside the first fitting element, wherein the sealing element is cylindrical with a first end portion having a cylindrical wall fixed in a groove in the first fitting element adjacent the wall defining the first bore, a body portion adjacent the first end portion wherein the body portion has a plurality of undulations and is resiliently axially compressible and includes a second end opposite the first end forming a first sealing surface facing away from the first end portion for sealing against a facing second sealing surface on a second fitting element;
the second fitting element being movable axially relative to the first fitting element wherein the first fitting and second fitting elements are configured to be joined through relative axial movement of the first and second fitting elements, and having wherein the second fitting element includes a cylindrical body defining a second bore with a second bore diameter through which fluid can pass, the second fitting element including a counterbore defining a larger diameter than the second bore diameter, and wherein the counterbore terminates at the second sealing surface facing the first sealing surface;
wherein the second fitting element counterbore receives the body portion of the sealing element; and
wherein the first and second fitting elements include facing first and second oppositely-facing surfaces that can come into contact with each other when the first and second fittings join together.

2. The fitting of claim 1 wherein the sealing element is a metallic and monolithic sealing element.

3. The fitting of claim 1 wherein the second end of the sealing element terminates at a circular rim having an inside diameter smaller than a maximum outside diameter of the sealing element.

4. The fitting of claim 1 wherein the sealing surface on the second end of the sealing element includes first and second frustoconical surfaces.

5. The fitting of claim 1 wherein the first end portion of the sealing element includes a textured surface.

6. The fitting of claim 1 wherein the sealing surface on the sealing element includes a surface extending at an angle to the axis of the first fitting element.

7. The fitting assembly of claim 1 wherein the facing sealing surface forms a frustoconical surface.

8. The fitting assembly of claim 7 wherein the frustoconical surface forms an angle of approximately 8°-9° to a plane perpendicular to the axis.

9. The fitting assembly of claim 1 wherein at least one of the first and second oppositely-facing surfaces is convex.

10. The fitting assembly of claim 1 wherein an outer surface of the first cylindrical body includes a first engagement structure, and wherein the fitting assembly includes a releasable tightening element having a second engagement structure configured to engage the first engagement structure such that tightening the releasable tightening element moves the first and second fitting elements relative to each other into engagement, and loosening the releasable tightening element moves the first and second fitting elements relative to each other for disengagement.

11. The fitting assembly of claim 1 further including an indicator element associated with at least one of the first and second fitting elements.

12. The fitting assembly of claim 11 further including a releasable tightening element wherein the indicator element is a portion of a rim surface on the releasable tightening element, and the indicator element is adapted to be moved into and out of a groove in the first fitting element.

13. The fitting assembly of claim 12 wherein the first fitting element includes an outwardly extending flange element containing the groove adapted to receive the indicator element.

14. The fitting assembly of claim 11 wherein the indicator element is configured such that the visibility of the indicator element is inversely proportional to the tightening of a releasable tightening element on the first fitting element.

15. The fitting assembly of claim 11 wherein the indicator element is configured such that it is invisible when the sealing surface associated with the first fitting element contacts the sealing surface on the second fitting element a desired amount.

* * * * *